United States Patent
Belgaied et al.

(10) Patent No.: US 7,912,926 B2
(45) Date of Patent: Mar. 22, 2011

(54) METHOD AND SYSTEM FOR NETWORK CONFIGURATION FOR CONTAINERS

(75) Inventors: Kais Belgaied, Sunnyvale, CA (US); Erik Nordmark, Mountain View, CA (US); Nicolas G. Droux, Rio Rancho, NM (US); Sunay Tripathi, San Jose, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 944 days.

(21) Appl. No.: 11/490,479

(22) Filed: Jul. 20, 2006

(65) Prior Publication Data

US 2008/0021985 A1 Jan. 24, 2008

(51) Int. Cl.
*G06F 15/177* (2006.01)
*G06F 7/00* (2006.01)
*G06F 17/00* (2006.01)
G06F 1/24 (2006.01)
G06F 9/00 (2006.01)
G06F 9/455 (2006.01)

(52) U.S. Cl. ........ 709/220; 707/609; 707/610; 707/620; 713/100; 718/1

(58) Field of Classification Search .................. 709/220, 709/223, 229; 707/100; 718/1
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,246,174 B2 * | 7/2007 | Sciandra et al. | 709/244 |
| 7,260,102 B2 | 8/2007 | Mehrvar et al. | |
| 7,313,142 B2 | 12/2007 | Matsuo et al. | |
| 2002/0049803 A1 * | 4/2002 | Bandhole et al. | 709/104 |
| 2003/0037154 A1 | 2/2003 | Poggio et al. | |
| 2004/0093522 A1 * | 5/2004 | Bruestle et al. | 713/201 |

(Continued)

OTHER PUBLICATIONS

Rehman, Rafeeq. "Solaris™ 8 Network Administrator Certification Training Guide". Pearson Certification. Print ISBN-10: 1-57870-261-5 Print ISBN-13: 978-1-57870-261-9. Published: Aug. 27, 2001.*

(Continued)

*Primary Examiner* — Ashok B Patel
*Assistant Examiner* — Kevin Bechtel
(74) *Attorney, Agent, or Firm* — Osha • Liang LLP (57) ABSTRACT

A method for changing network configuration parameters that includes generating a request to change a network configuration parameter by a user, determining whether the user is allowed to change the network configuration parameter using a network configuration database, if the user is allowed to change the network configuration parameter, updating the network configuration database to reflect the change in the network configuration parameter, updating a container associated with the network configuration parameter to reflect the change in the configuration parameter, and if the user is not allowed to change the network configuration parameter, dropping the request.

23 Claims, 7 Drawing Sheets

U.S. PATENT DOCUMENTS

| | | | |
|---|---|---|---|
| 2004/0260818 A1* | 12/2004 | Valois et al. | 709/229 |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1* | 6/2005 | Lewites | 718/1 |
| 2005/0172156 A1* | 8/2005 | Gbadegesin et al. | 713/201 |
| 2006/0041667 A1 | 2/2006 | Ahn et al. | |
| 2006/0045089 A1* | 3/2006 | Bacher et al. | 370/392 |
| 2006/0070066 A1 | 3/2006 | Grobman | |
| 2006/0174324 A1 | 8/2006 | Zur et al. | |

OTHER PUBLICATIONS

Robichaux, Paul. "Managing the Windows 2000 Registry". O'Reilly Media, Inc. Print ISBN-13: 978-1-565-92943-2. Published: Aug. 30, 2000.*

Bob Sheldon; Ethan Wilansky. "MCSA/MCSE Self-Paced Training Kit: Microsoft® Windows® 2000 Server: Exam 70-215, Second Edition". Microsoft Press. Print ISBN-10: 0-7356-1767-8 Print ISBN-13: 978-0-7356-1767-4. Published: Aug. 14, 2002.*

"Solaris Networking—The Magic Revealed (Part I)"; Sunay Tripathi's Solaris Networking Weblog; Nov. 14, 2005, pp. 1-22 (22 pages).

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

Tripathi, S.; "Crossbow: Network Virtualization and Resource Control"; Presentation to Sun Labs Open House; Jun. 1, 2006; (22 pages).

* cited by examiner

METHOD AND SYSTEM FOR NETWORK CONFIGURATION FOR CONTAINERS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821 "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for changing network configuration parameters. The method comprises generating a request to change a network configuration parameter by a user, determining whether the user is allowed to change the network configuration parameter using a network configuration database, if the user is allowed to change the network configuration parameter, updating the network configuration database to reflect the change in the network configuration parameter, updating a container associated with the network configuration parameter to reflect the change in the configuration parameter, and if the user is not allowed to change the network configuration parameter, dropping the request.

In general, in one aspect, the invention relates to a method for changing network configuration parameters. The method comprises generating a request to change a network configuration parameter by a user, wherein the request specifies a virtual network stack with which the network configuration parameter is associated, determining whether the user is allowed to change the network configuration parameter, if the user is allowed to change the network configuration parameter, updating a network configuration database to reflect the change in the network configuration parameter, updating a container associated with the network configuration parameter to reflect the change in the configuration parameter, and if the user is not allowed to change the network configuration parameter, dropping the request.

In general, in one aspect, the invention relates to a host. The host comprises a global container comprising a network configuration database comprising a first entry, wherein the first entry specifies a non-global container and a first plurality of network configuration parameters a non-global container can change, the non-global container, executing in the global container comprising a container-specific network configuration database comprising a second entry, wherein the second entry specifies a user and a second plurality of network configuration parameters the user can change, wherein the second plurality of network configuration parameters is a subset of the first plurality of network configuration parameters, wherein the non-global container is configured to receive a request to change a network configuration parameter from a user in the non-global container, determine whether the user is allowed to change the network configuration parameter using the container-specific network configuration database, if the user is allowed to change the network configuration parameter, change the network configuration parameter in the non-global container, update the container-specific network configuration database to reflect the change in the network configuration parameter, and if the user is not allowed to change the network configuration parameter, drop the request.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for changing network configuration parameters. Further, embodiments of the invention provide a method and system for limiting the network configuration parameters that a non-global container may change.

In one embodiment of the invention, a network configuration parameter corresponds to any parameter that is associated with networking. Examples, of network configuration parameters may include, but are not limited to, Media Access Control (MAC) address, Internet Protocol (IP) address, IP routing algorithm (e.g., Routing Information Protocol (RIP), Open Shortest Path First (OSPF), etc.), transport layer protocol (e.g., Transmission Control Protocol (TCP), User Datagram Protocol (UDP), default route (i.e., the route, set in the IP routing table, used when no other entry in the IP routing table matches the destination IP address of the packet), TCP parameters (i.e., parameters in the TCP that may be changed, for example, bandwidth-delay product, buffer size, etc.), IP parameters (i.e., parameters in the IP that may be changed), and TCP port number.

Figure 1:
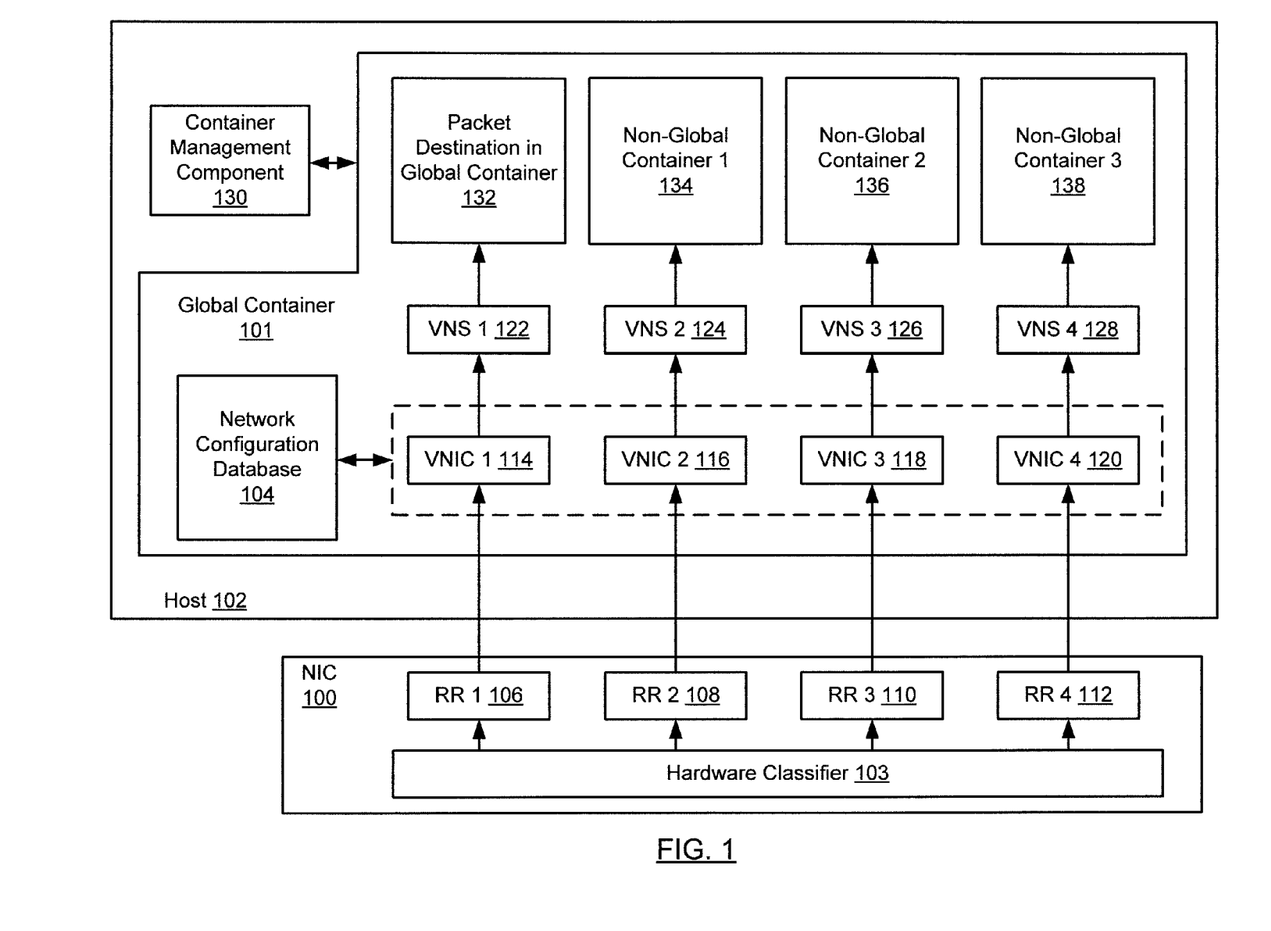
FIG. 1 shows a system in accordance with one embodiment of the invention.

FIG. 1 shows a system in accordance with one embodiment of the invention. The system shown in FIG. 1 includes a host (102) and a network interface card (NIC) (100). The NIC (100) includes a hardware classifier (103) and a number of receive rings (RRs) (106, 108, 110, 112). The NIC (100) is configured to send and receive packets. The hardware classifier (103) is configured classify incoming packets (i.e. packets received by the NIC (100) from the network (not shown) (e.g., the Internet, a wide area network (WAN), a local area network (LAN), etc.). The hardware classifier (103) classifies a packet based on information in the header of the packet. Accordingly, the hardware classifier (103) may classify the packet based on one or a combination of the following: the source internet protocol (IP) address, the destination IP address, a source Media Access Control (MAC) address, a destination MAC address, a source port, a destination port, a protocol type (e.g., Transmission Control Protocol (TCP), User Datagram Protocol (UDP), etc.) The hardware classifier (103) is not limited to classifying a packet based on one of the aforementioned parameters.

Continuing with the discussion of FIG. 1, once a packet has been classified, the packet is forwarded to the appropriate RR (106, 108, 110, 112). Typically, each RR (106, 108, 110, 112) is configured to receive packets for a specific non-global container (134, 136, 138) or a particular packet destination in the global container (132). In one embodiment of the invention, each RR (106, 108, 110, 112) corresponds to a buffer in the NIC (100), which is configured to store a finite number of packets.

The host (102) includes a device driver (not shown), a number of virtual network interface cards (VNICs) (114, 116, 118, 120), one or more virtual network stacks (VNSs) (122, 124, 126, 128), one or more packet destinations in the global container (132), one or more non-global containers (134, 136, 138), a container management component (130), and a network configuration database (104). Each of the aforementioned components is described below.

Though not shown in FIG. 1, the device driver is configured to expose the NIC (100) to the host (102). Further, the device driver is configured to expose the individual RRs (106, 108, 110, 112) to the host (102). Exposing the aforementioned components to the host (102) includes providing application programming interfaces (APIs) to allow the host (102) (or components executing therein) to interact with the NIC (100) and the RRs (106, 108, 110, 112) on the NIC (100). Interacting with the NIC (100) typically includes obtaining packets from the NIC (100) and sending packets to the NIC (100).

Each VNIC (114, 116, 118, 120) in the host (102) includes the same functionality as the NIC (100). However, unlike the NIC (100), the VNICs (114, 116, 118, 120) are implemented in the host (102), typically, in a MAC layer of the host (102). To all components above the VNICs (114, 116, 118, 120) (e.g., the VNSs (122, 124, 126, 128), the packet destination in the global container (132), and the non-global containers (134, 136, 138)) the VNICs (114, 116, 118, 120) appear as physical NICs.

Each VNIC (114, 116, 118, 120) is associated with a MAC address and an IP address. Further, each VNIC (114, 116, 118, 120) may be optionally associated with a TCP port. Further, each VNIC (114, 116, 118, 120) is associated with a RR (106, 108, 110, 112) such that the VNICs (114, 116, 118, 120) obtain packets from the RR (106, 108, 110, 112) with which it is associated. For example, VNIC 1 (114) obtains packets from RR 1 (106). As discussed above, each VNIC (114, 116, 118, 120) may be associated with a VNS (122, 124, 126, 128). The VNS is described in FIG. 2 below.

As shown in FIG. 1, the host (102) includes a global container (101) and a number of non-global containers (134, 136, 138). The global container (101) corresponds to an isolated execution environment within the host (102). Further, each non-global container (134, 136, 138) corresponds to an isolated execution environment within the global container (101). All of the containers (global and non-global) share a common kernel and, accordingly, are executing the operating system. While all of the aforementioned containers share a common kernel, the non-global containers (134, 136, 138) are configured such that processes executing in a given non-global container are restricted to execute in the non-global container and have no access to resources not assigned to the non-global container. An example of a container is a Solaris™ Container. (Solaris is a trademark of Sun Microsystems, Inc. of California, USA).

As shown in FIG. 1, each container (global and non-global) is associated with a VNS (122, 124, 126, 128). The container is configured to receive packets and send packets using the VNS (122, 124, 126, 128) with which it is associated. For example, non-global container 1 (134) is configured to send and receive packets via VNS 2 (124).

The isolated execution environments of each non-global container (134, 136, 138) as well as the global container (132) are managed by a container management component executing on the host (102). The container management component (130) typically executes outside of the global container (101).

In one embodiment of the invention, the packet destination in the global container (132) corresponds to a process executing in the global container (101), where the process is configured to send and receive packets but does not include its own internal networking stack. Rather, the packet destination (132) uses a VNS (e.g., 122) executing in the global container (101).

In one embodiment of the invention, the network configuration database (104) is configured to maintain all network configuration parameters associated with the networking components in the host (102). Accordingly, the configuration database (104) may include network configuration parameters for each packet destination in the global container (132), each non-global container (134, 136, 138), and each VNIC (114, 116, 118, 120). Further, the network configuration database (104) also includes information about which network configuration parameters may be changed and who (i.e., user with a specific privilege) is allowed to change them (see FIGS. 3, 5A, 5B below).

In addition, the network configuration database (104) may also indicate the allowable values each network configuration parameter may be changed to. For example, the network configuration database (104) may allow a user to change the IP address of non-global container 1 (134), but the network configuration database (104) may include a list of IP addresses to which the IP address of non-global container 1 (134) may be changed. Finally, as shown in FIG. 1, the network configuration database (104) is configured to receive requests to change network configuration parameters from non-global containers (134, 136, 138) via the associated VNICs (116, 118, 120).

Figure 2:
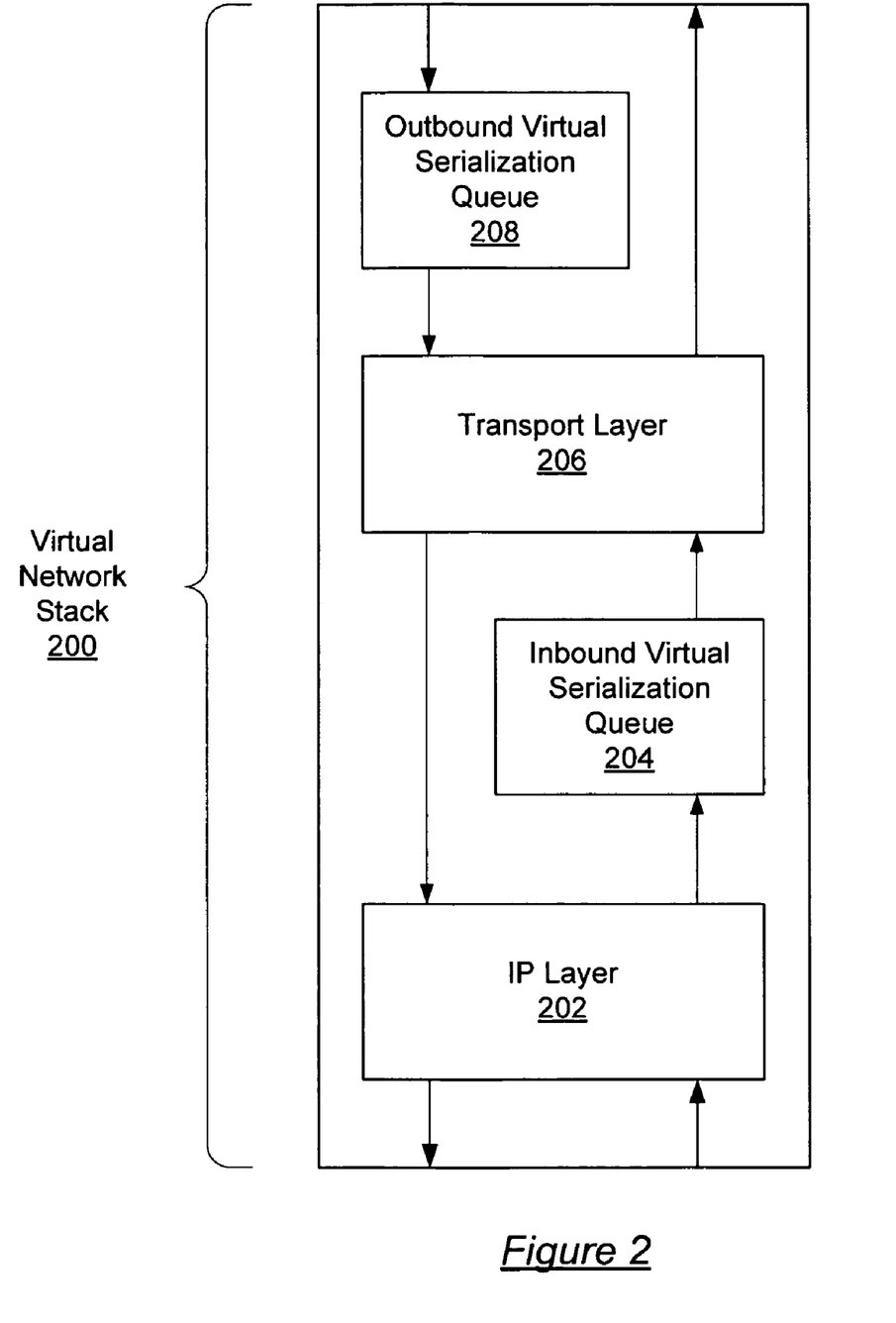
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (VSQ) (204), a transport layer (206), and an outbound serialization queue (208). Each of the aforementioned components is discussed below.

In one embodiment, the IP layer (202) is configured to receive packets from the VNIC associated with the VNS (200) (e.g., VNS 1 (122) receives packets from VNIC 1 (114) in FIG. 1). Further, the IP layer (202) is configured to receive packets from the transport layer (206). In one embodiment of the invention, the IP layer (202) is configured to perform IP level processing for both inbound and outbound packets.

Continuing with the discussion of FIG. 2, the inbound VSQ (204) is configured to receive packets from the IP layer (202).

The inbound VSQ (204) corresponds to a queue data structure and is configured to queue packets received from the IP layer (202) prior to the packets being processed by the transport layer (206). In one embodiment of the invention, the inbound VSQ (204) may be used to control the number of packets being received by the packet destination (or non-global container) associated with VNS. The inbound VSQ (204) may control the bandwidth by limiting the number of packets in the VSQ (204) and preventing additional packets from entering the VNS (200) until the inbound VSQ (204) has less than a threshold number of packets.

In one embodiment of the invention, the transport layer (206) is configured to process inbound and outbound packets in accordance with Transmission Control Protocol (TCP), User Datagram Protocol (UDP), or both UDP and TCP. Other protocols may be supported by the transport layer (206).

In one embodiment of the invention, the outbound VSQ (208) is a queue data structure configured to receive packets from the packet destination (or non-global container) with which the VNS (200) is associated. Further, the outbound VSQ (208) is configured to store packets prior to sending the received packets to the transport layer (206). In one embodiment of the invention, the outbound VSQ (208) is also configured to control the flow of packets from the packet destination (or non-global container associated with the VNS (200) to the VNS (200). In one embodiment of the invention, the outbound VSQ (208) (or a related process) is configured to block an application for sending packets to the outbound VSQ (208), if the packet destination (or non-global container) is attempting to issue packets at a higher rate than the outbound bandwidth allocated to the packet destination (or non-global container). Further, the outbound VSQ (208) (or a related process) is configured to notify the packet destination (or non-global container) when it is no longer blocked from issuing packets to the VNS (200).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the packet processing requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (206) only supports UDP, then the inbound VSQ (204) and outbound VSQ (208) may be configured to allow concurrent access. Said another way, two or more threads may concurrently access the VSQ (inbound or outbound). In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

In one embodiment of the invention, the inbound VSQ (204) and the outbound VSQ (208) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

Figure 3:
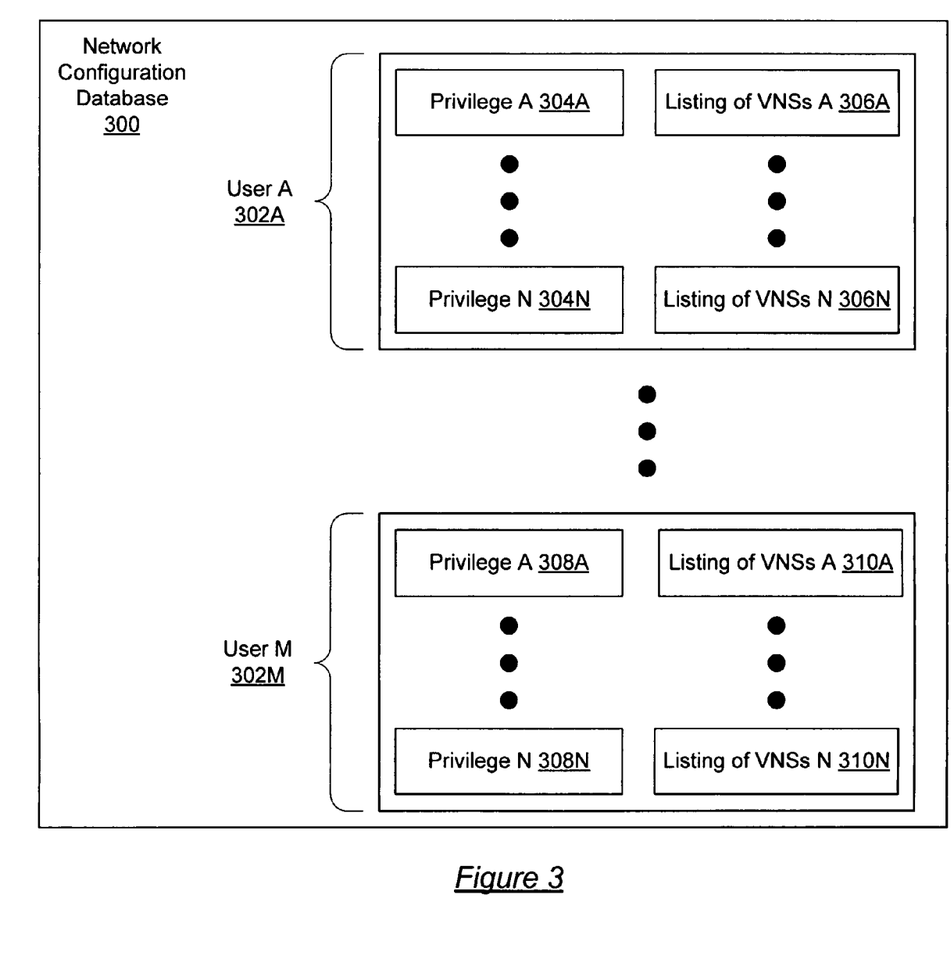
FIG. 3 shows a network configuration database in accordance with one embodiment of the invention.

FIG. 3 shows a network configuration database in accordance with one embodiment of the invention. The network configuration database (300) includes an entry for each user (302A, 302M). Each entry includes a listing of privileges (304A, 304N, 308A, 308N) and the corresponding VNSs (306A, 306N, 310A, 310N) associated with each privilege.

In one embodiment of the invention, each privilege corresponds to network configuration parameter (or grouping of network configuration parameters) the user is allowed to change. Examples of privileges may include, but are not limited to, Media Access Control (MAC) change privilege, an Internet Protocol (IP) address change privilege, a default route change privilege, an IP routing algorithm change privilege, a Transport layer algorithm change privilege, TCP parameters change privilege, IP parameters change privilege, and a TCP port number change privilege.

The listing of VNSs (306A, 306N, 310A, 310N) associated with each of the privileges associated with a user indicates to which VNSs (306A, 306N, 310A, 310N) the privilege applies. Further, by listing a specific VNS, the privileges may extend to the VNIC associated with the VNS and the non-global container or packet destination associated with the VNS.

For example, user A (302A) may be associated with a MAC address change privilege and an IP routing algorithm change privilege. Further, the MAC address change privilege is associated with VNS 2 (124 in FIG. 1) and VNS 3 (126 in FIG. 1) and the IP routing algorithm change privilege is associated with VNS 2 (124 in FIG. 1). Thus, user A (302A) may change the MAC address associated with VNS 2 (124 in FIG. 1), which results in VNIC 2 (116 in FIG. 1) being updated with the new MAC address. Further, user A (302A) may change the IP routing algorithm for VNS 2 to RIP, where the change is reflected in the IP layer of VNS 2 (124 in FIG. 1).

In one embodiment of the invention, each entry in the Network Configuration Database (300) includes a listing of privileges (304A, 304N, 308A, 308N) and the corresponding containers (101, 134, 136, 138) associated with each of the privileges. In this case, the container (101, 134, 136, 138) (or a process executing therein) may change any network configuration parameter for which it has the appropriate privilege. Further, the privileges associated with a given container are applied to all VNSs (122, 124, 126, 128) associated with the container (101, 134, 136, 138).

Figure 4:
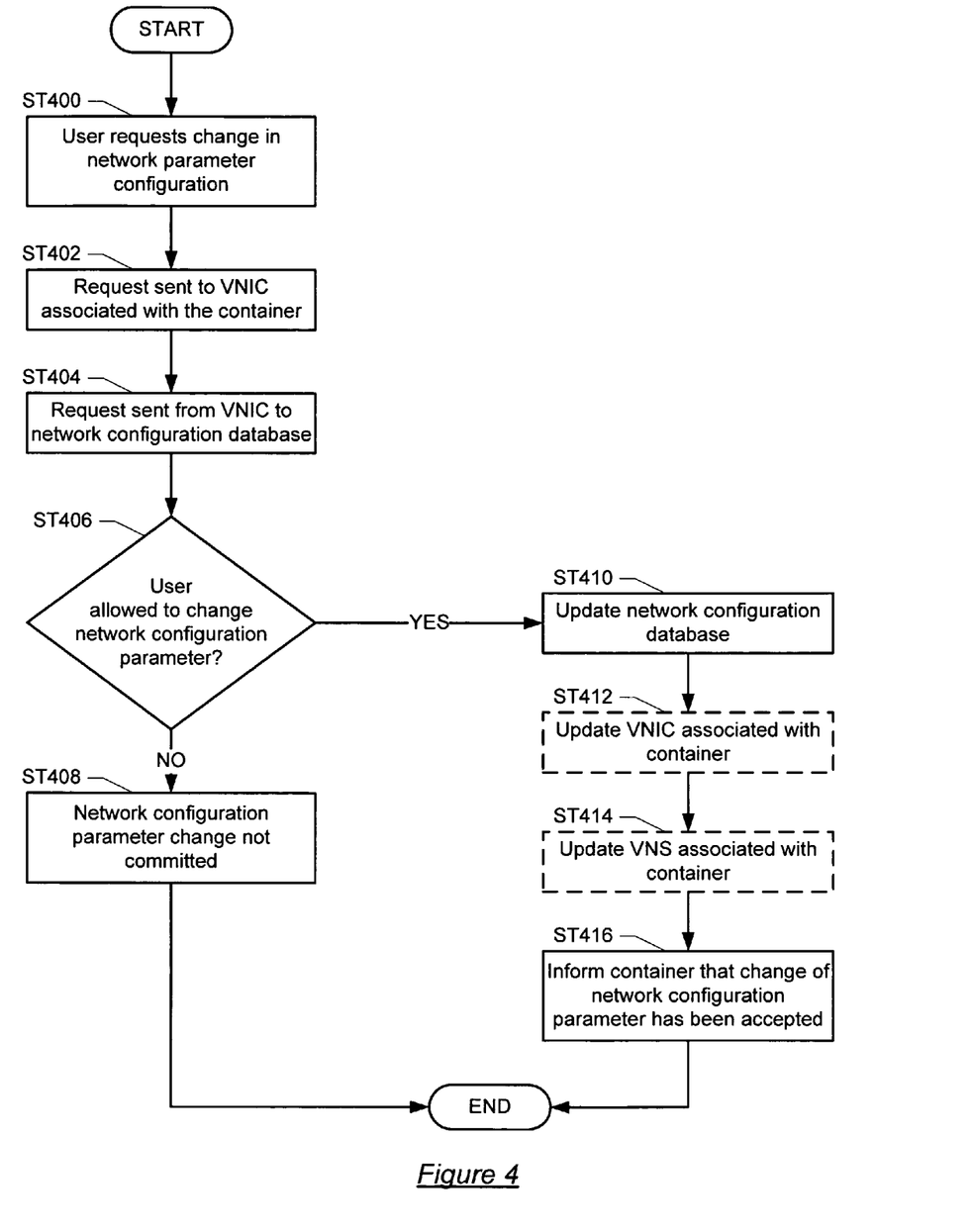
FIG. 4 shows a flowchart in accordance with one embodiment of the invention.

FIG. 4 shows a flowchart in accordance with one embodiment of the invention. More specifically, FIG. 4 shows a method for changing a networking configuration parameter using the network configuration database in FIG. 3.

Initially, a user requests a change in a network configuration parameter (ST400). The request may include the network configuration parameter that the user is attempting to change, the new value for the network configuration parameter, and the VNS with which the network configuration parameter is associated. In one embodiment of the invention, if the request is issued by a user from a non-global container, then the VNS is derived from the source of the request. Accordingly, in such cases, the VNS corresponds to the VNS associated with the non-global container from which the user issued the request.

Continuing with the discussion in FIG. 4, the request is sent from the non-global container (or a packet destination in the global container) to the associated VNIC (ST402). Upon receipt of the request, the VNIC sends the request to the network configuration database (ST404).

Once received, the network configuration database determines whether the user is allowed to change the network configuration parameter (i.e., the network configuration parameter in the request) (ST406). As discussed above, if the network configuration database corresponds to the network configuration database in FIG. 3, then the determination in ST406 corresponds to determining whether (i) the user has the necessary privilege to change the network configuration parameter and (ii) whether the user is allowed to apply this privilege to the VNS with which the network configuration parameter is associated.

If the user is not allowed to change the network configuration parameter, then change to the network configuration parameter is not committed to the network configuration database (ST408) and the process ends. Alternatively, if the user is allowed to change the network configuration parameter, then the network configuration database is updated to reflect the change in the network configuration parameter (ST410). Optionally, the VNIC associated with the container is subsequently updated (ST412). ST412 is optional as the network configuration parameter that is changed may not affect the VNIC. For example, if the IP address is changed, then the VNIC is updated to include the new IP address. However, if the IP routing algorithm was changed, then the VNIC is not affected and, thus, is not changed.

Optionally, the VNS associated with the container is subsequently updated (ST414). ST414 is optional as the network configuration parameter that is changed may not affect the VNS. For example, if the IP address is changed, then the VNIC is updated to include the new IP address but the VNS is not updated. However, if the IP routing algorithm was changed, then the VNS (or more specifically the IP layer in the VNS) is updated. Finally, the container from which the user requested the change in the network configuration parameter is informed that change has been accepted (ST416). Though not shown in FIG. 4, the container, upon being informed of the change in the network configuration parameter, may be updated to reflect the change in the network configuration parameter.

Figure 5A:
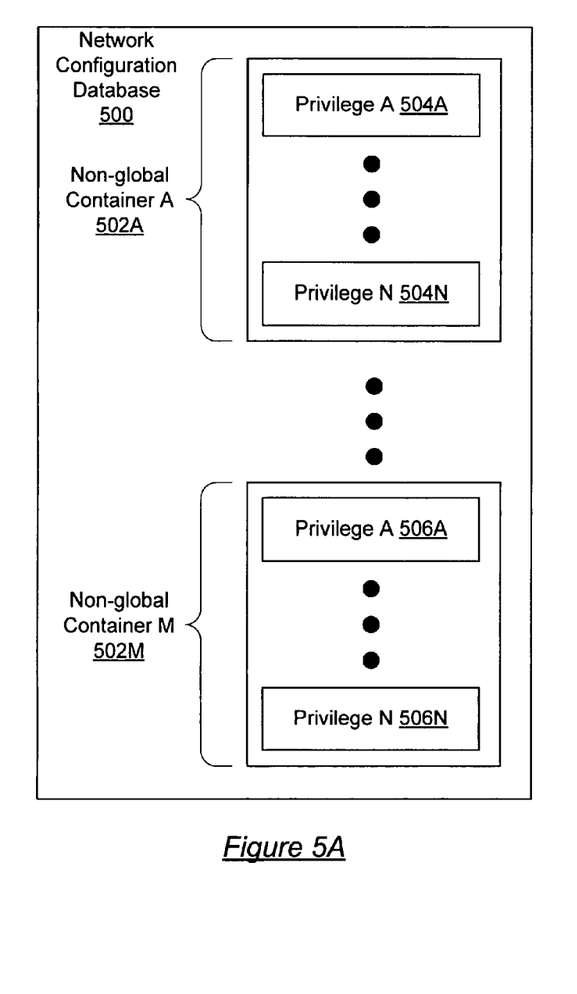
FIGS. 5A and 5B show network configuration databases in accordance with one or more embodiments of the invention.

FIG. 5A shows a network configuration database in accordance with one embodiment of the invention. The network configuration database (500) includes an entry for each non-global container (502A, 502M) in the global container. Each of the aforementioned entries includes a listing of privileges (504A, 504N, 506A, 506N), that the non-global container (or more specifically, a process executing in the non-global container) may possess. In one embodiment of the invention, the listing of privileges in the aforementioned entry corresponds to the privileges that an administrator-level user in the non-global container may possess. In one embodiment of the invention, a user in a non-global container may not have more privileges than the privileges listed in the corresponding entry in the network configuration database (500).

In one embodiment of the invention, though not shown in FIG. 5A, the global container is not associated with an entry. Rather, the global container is associated with a set of entries corresponding to the entries in FIG. 3. Thus, non-global containers use the entries shown in FIG. 5A and the global container uses entries of the type shown in FIG. 3. In one embodiment of the invention, the entries associated with the global container are located in the network configuration database of FIG. 5A. Thus, though not shown in FIG. 5A, the network configuration database on FIG. 5A includes the entries shown in FIG. 5A for non-global containers along with the entries shown in FIG. 3, where the entries of the type shown in FIG. 3 are limited to entries corresponding to the global container.

Figure 5B:
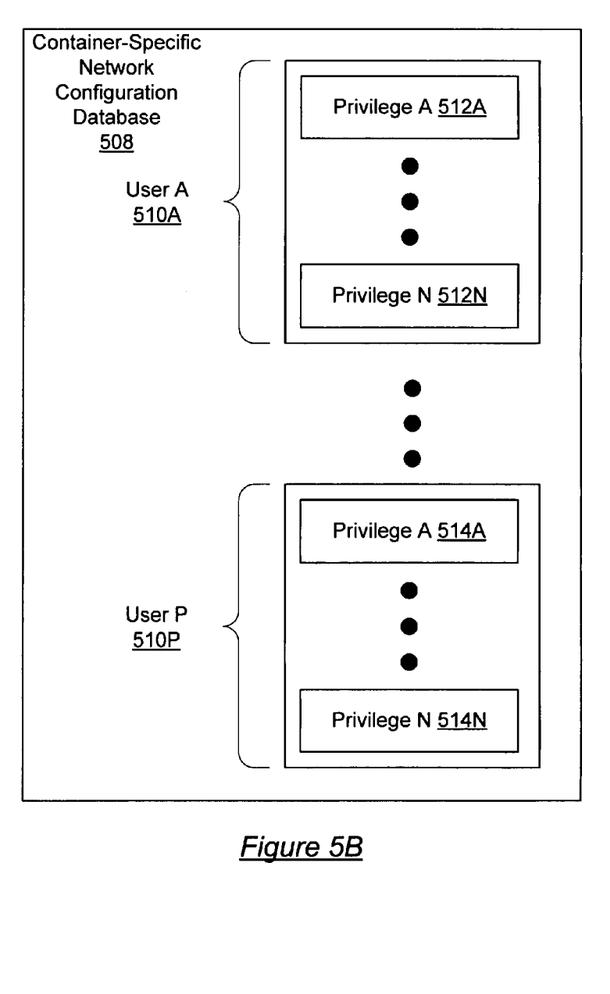

FIG. 5B shows a network configuration database in accordance with one embodiment of the invention. More specifically, FIG. 5B shows a container-specific network configuration database (508) in accordance with one embodiment of the invention. The container-specific network configuration database (508) includes an entry for each user (510A, 510P) in the corresponding container (typically a non-global container). For each user (510A, 510P), the corresponding entry lists the privileges (512A, 512N, 514A, 514N) that the user has. The privileges only apply to the container with which the container-specific network configuration database (508) is associated. For example, if the container-specific network configuration database (508) is associated with non-global container 1 (134 in FIG. 1), then the privileges (512A, 512N, 514A, 514N) listed in container-specific network configuration database (508) as only applicable to non-global container 1 (134 in FIG. 1).

The listing of privileges (512A, 512N, 514A, 514N) associated with each user (510A, 510P) is limited by the privileges associated with the container as specified in the network configuration database (see FIG. 5A). Thus, a given user (510A, 510P) may have all the privileges specified in the corresponding entry in the network configuration database or a subset of the privileges specified in the corresponding entry in the network configuration database.

For example, in the network configuration database, non-global container 1 (134 in FIG. 1) may have the following privileges: Media Access Control (MAC) change privilege, an Internet Protocol (IP) address change privilege, a default route change privilege, TCP parameters change privilege and a TCP port number change privilege. Thus, a user in non-global container 1 (134 in FIG. 1) may, at most, have the aforementioned privileges. Thus, user A in non-global container 1 (134 in FIG. 1) may be assigned the following privileges: Media Access Control (MAC) change privilege and an Internet Protocol (IP) address change privilege. In this case, user A has a subset of the privileges.

Though not shown in FIG. 5A or 5B, in one embodiment of the invention, in addition to storing the information shown in FIGS. 5A and 5B, the network configuration database (500) stores the network configuration parameters for all global and non-global containers. Alternatively, in one embodiment of the invention, the network configuration database (500) stores the network configuration parameters for all global and non-global containers and the container-specific network configuration database (508) stores the network configuration parameters for the non-global container with which it is associated. Finally, in one embodiment of the invention, the network configuration database (500) stores the network configuration parameters for the global container and the container-specific network configuration database (508) stores the network configuration parameters for the non-global container with which it is associated.

In one embodiment of the invention, the container-specific network configuration database for a given non-global container is stored in the corresponding non-global container. For example, container-specific network configuration database for non-global container 1 (134 in FIG. 1) is stored in non-global container 1 (134 in FIG. 1).

Figure 6:
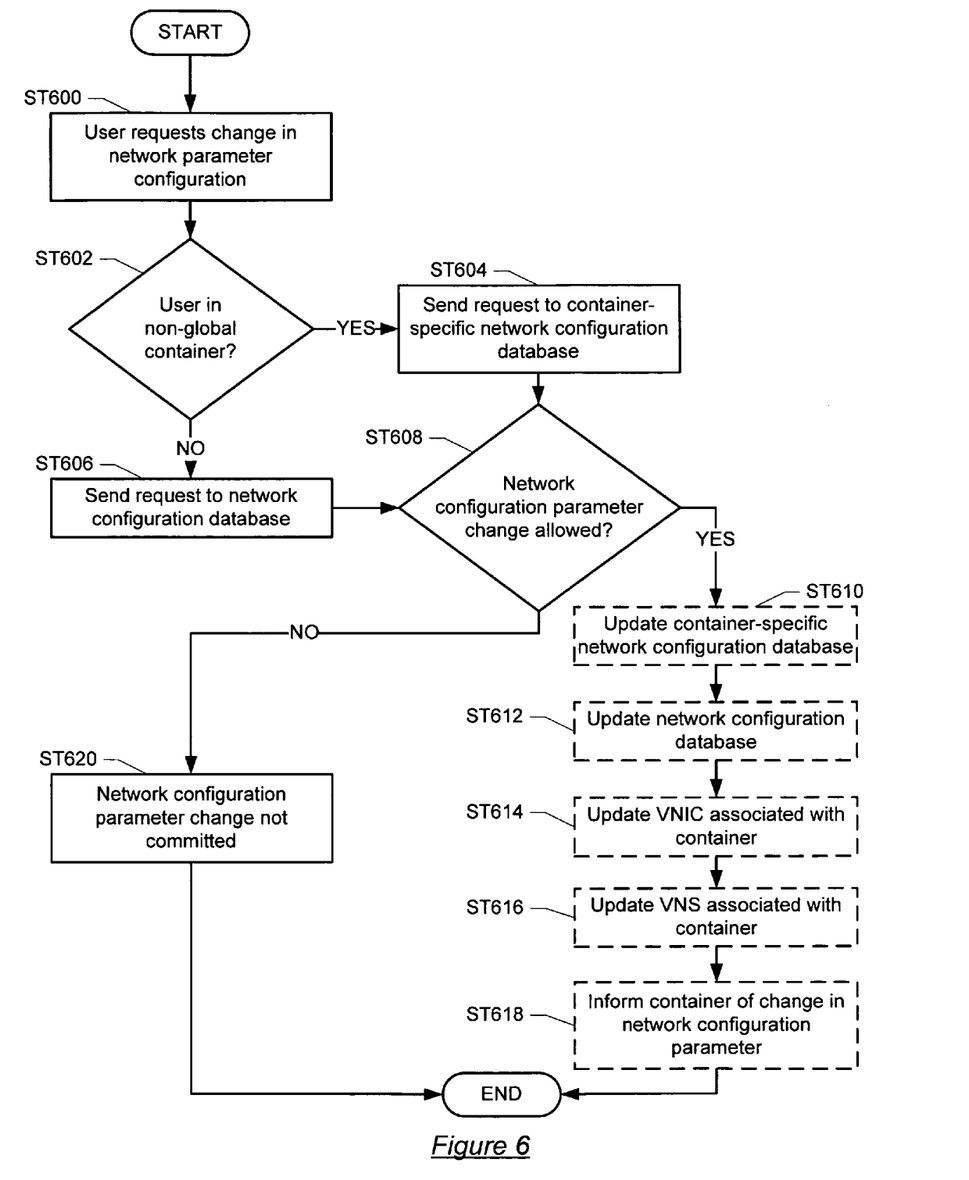
FIG. 6 shows a flowchart in accordance with one embodiment of the invention.

FIG. 6 shows a flowchart in accordance with one embodiment of the invention. More specifically, FIG. 6 shows a method for changing a networking configuration parameter using the network configuration databases in FIGS. 5A and 5B.

Initially, a user requests a change in a network configuration parameter (ST600). The request may include the network configuration parameter that the user is attempting to change, the new value for the network configuration parameter, and the VNS with which the network configuration parameter is associated. In one embodiment of the invention, if the request is issued by a user from a non-global container, then the VNS may be derived from the source of the request. Accordingly, in such cases, the VNS corresponds to the VNS associated with the non-global container from which the user issued the request and the request may not explicitly include the VNS with which the network configuration parameter is associated.

If the user is in a non-global container (ST602), then the method proceeds to ST604. Alternatively, if the user is in the global container (ST602), then the method proceeds to ST606. Those skilled in the art will appreciate that ST602 is implicitly performed based on the location (global container or non-global container) from which the user issued the request.

If the request was issued from a global container, the global container sends the request to the network configuration database (e.g., the modified network configuration database discussed in FIG. 5A) (ST606). Alternatively, if the request was issued from a non-global container, then the request is sent to the container-specific network configuration database (ST604).

Once received, the network configuration database or the container-specific network configuration database determines whether the user is allowed to change the network configuration parameter (i.e., the network configuration parameter in the request) (ST608). As discussed above, if the network configuration database corresponds to the network configuration database in FIG. 5A and the network configuration parameter is associated with the global container, then the determination in ST608 corresponds to determining whether (i) the user has the necessary privilege to change the network configuration parameter and (ii) whether the user is allowed to apply this privilege to the VNS with which the network configuration parameter is associated.

Alternatively, if the network configuration database corresponds to the container-specific network configuration database in FIG. 5A and the network configuration parameter is associated with a non-global container, then the determination in ST608 corresponds to determining whether the user has the necessary privilege to change the network configuration parameter.

In either case, if the requested network configuration parameter is not allowed to be changed, then the change to the network configuration parameter is not committed (ST620) and the process ends. If the change to the network configuration parameter is allowed, then the container-specific network configuration database is updated if the network configuration parameter is associated with a non-global container and the container-specific network configuration database is configured to store the aforementioned network configuration parameter (ST610).

The network configuration database is optionally updated to reflect to change in the network configuration parameter (ST612). ST612 depends on (i) whether the changed network configuration parameter is associated with a global or non-global container and (ii) whether the network configuration database is configured to store the aforementioned network configuration parameter.

Optionally, the VNIC associated with the container is subsequently updated (ST614). ST614 is optional as the network configuration parameter that is changed may not affect the VNIC. For example, if the IP address is changed, then the VNIC is updated to include the new IP address. However, if the IP routing algorithm was changed, then the VNIC is not affected and, thus, is not changed.

Optionally, the VNS associated with the container is subsequently updated (ST616). ST616 is optional as the network configuration parameter that is changed may not affect the VNS. For example, if the IP address is changed, then the VNIC is updated to include the new IP address but the VNS is not updated. However, if the IP routing algorithm was changed, then the VNS (or more specifically the IP layer in the VNS) is updated. Finally, the container (global or non-global), is updated, as necessary, to reflect the change in the network configuration parameter (ST618).

Figure 7:
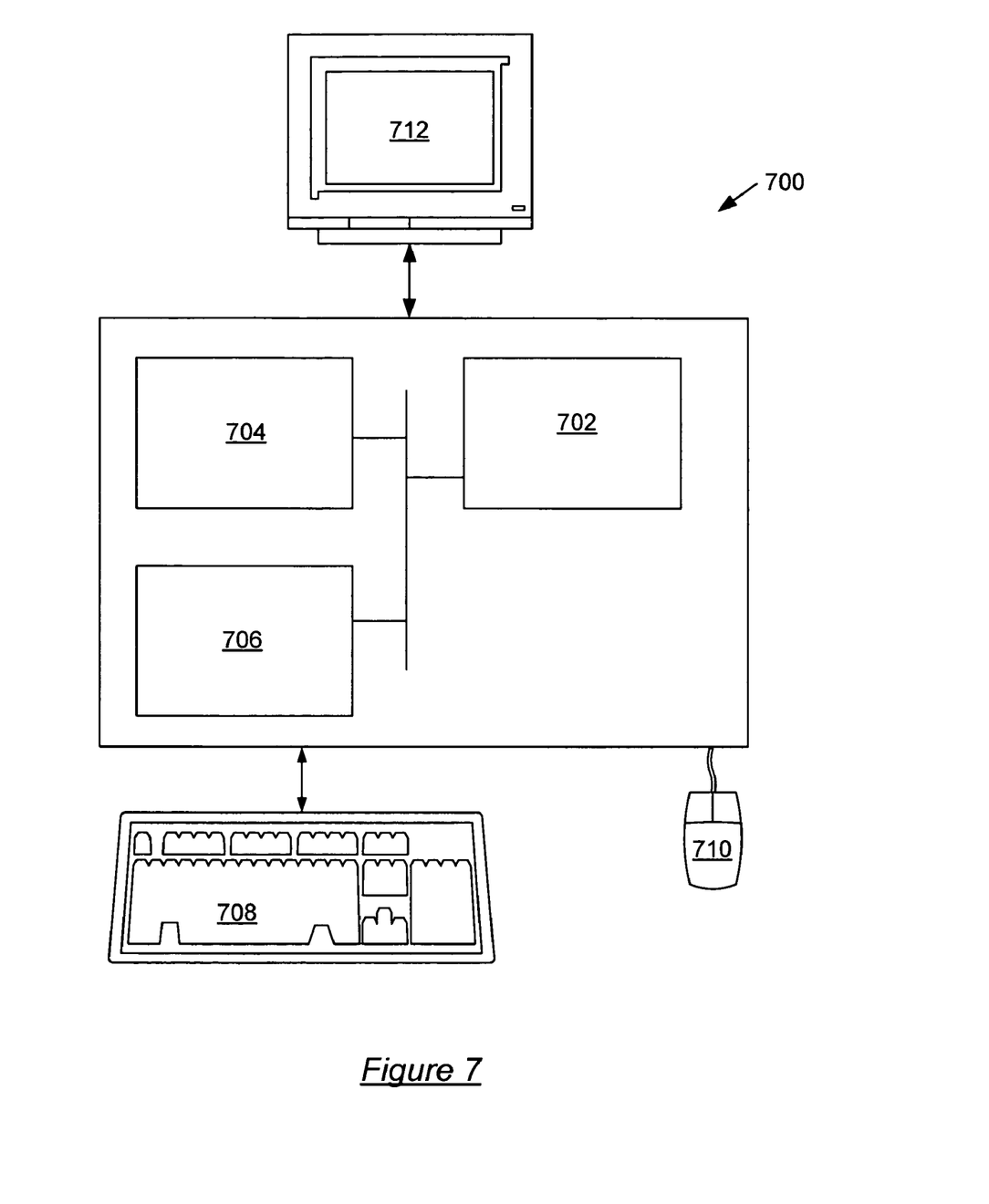
FIG. 7 shows a computer system in accordance with one embodiment of the invention.

An embodiment of the invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network via a network interface connection (not shown). Those skilled in the art will appreciate that these input and output means may take other forms. Further, those skilled in the art will appreciate that one or more elements of the aforementioned computer (700) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for changing network configuration parameters, comprising:
   generating a request to change a network configuration parameter by a user;
   determining whether the user is allowed to change the network configuration parameter using a network configuration database;
   if the user is allowed to change the network configuration parameter:
      updating the network configuration database to reflect the change in the network configuration parameter;
      updating a container associated with the network configuration parameter to reflect the change in the network configuration parameter; and
   if the user is not allowed to change the network configuration parameter:
      dropping the request,
   wherein the network configuration database is located in a global container,
   wherein the container is one of a plurality of non-global containers executing in the global container,
   wherein the container is an isolated execution environment,
   wherein the global container is an execution environment within a host,
   wherein the network configuration database comprises at least one entry specifying the user, wherein the at least one entry specifies at least one network configuration parameter which the user is allowed to change, wherein the at least one entry specifies at least one virtual network stack associated with the at least one network configuration parameter which the user is allowed to change, and wherein the at least one virtual network stack is one of a plurality of virtual network stacks executing in the global container.

2. The method of claim 1, wherein determining whether the user is allowed to change the network configuration parameter comprises determining whether the user has a privilege to change the network configuration parameter.

3. The method of claim 2, wherein the privilege is stored in the network configuration database.

4. The method of claim 2, wherein the privilege is one selected from a group consisting of Media Access Control (MAC) change privilege, an Internet Protocol (IP) address change privilege, a default route change privilege, an IP routing algorithm change privilege, and a Transport Layer Algorithm change privilege.

5. The method of claim 1, wherein the network configuration parameter is at least one selected from a group consisting of a Media Access Control (MAC) address and an internet protocol (IP) address.

6. The method of claim 1, wherein each of the plurality of non-global containers is associated with a respective one of the plurality of virtual network stacks executing in the global container.

7. The method of claim 1, wherein each of the plurality of virtual network stacks is associated with a respective one of a plurality of virtual network interface cards executing in the global container.

8. The method of claim 1, wherein the global container and the plurality of non-global containers share a common operating system kernel.

9. A method for changing network configuration parameters, comprising:
  generating a request to change a network configuration parameter by a user, wherein the request specifies a virtual network stack with which the network configuration parameter is associated;
  determining, using a network configuration database, whether the user is allowed to change the network configuration parameter;
  if the user is allowed to change the network configuration parameter:
    updating the network configuration database to reflect the change in the network configuration parameter;
    updating a container associated with the network configuration parameter to reflect the change in the network configuration parameter; and
  if the user is not allowed to change the network configuration parameter:
    dropping the request,
  wherein the network configuration database is located in a global container,
  wherein the container is one of a plurality of non-global containers executing in the global container,
  wherein the container is an isolated execution environment,
  wherein the global container is an execution environment within a host,
  wherein the network configuration database comprises at least one entry specifying the user,
  wherein the at least one entry specifies that the user is allowed to change the network configuration parameter, wherein the at least one entry specifies that the network configuration parameter is associated with the virtual network stack, wherein the virtual network stack is associated with the container, and wherein the virtual network stack is one of a plurality of network stacks executing in the global container.

10. The method of claim 9, wherein determining whether the user is allowed to change the network configuration parameter comprises determining whether the user has a privilege to change the network configuration parameter associated with the virtual network stack.

11. The method of claim 10, wherein the privilege is one selected from a group consisting of Media Access Control (MAC) change privilege, an Internet Protocol (IP) address change privilege, a default route change privilege, an IP routing algorithm change privilege, and a Transport Layer Algorithm change privilege.

12. The method of claim 9, wherein the network configuration database specifies privileges associated with the user on a per-virtual network stack basis.

13. The method of claim 9, wherein each of the plurality of non-global containers is associated with a respective one of the plurality of virtual network stacks executing in the global container.

14. The method of claim 9, wherein each of the plurality of virtual network stacks is associated with a respective one of a plurality of virtual network interface cards executing in the global container.

15. The method of claim 9, wherein the global container and the plurality of non-global containers share a common operating system kernel.

16. A non-transitory computer readable medium having instructions stored thereon, which when executed by a processor perform a method, the method comprising:
  generating a request to change a network configuration parameter by a user;
  determining whether the user is allowed to change the network configuration parameter using a network configuration database;
  if the user is allowed to change the network configuration parameter:
    updating the network configuration database to reflect the change in the network configuration parameter;
    updating a container associated with the network configuration parameter to reflect the change in the network configuration parameter; and
  if the user is not allowed to change the network configuration parameter:
    dropping the request,
  wherein the network configuration database is located in a global container,
  wherein the container is one of a plurality of non-global containers executing in the global container,
  wherein the container is an isolated execution environment,
  wherein the global container is an execution environment within a host,
  wherein the network configuration database comprises at least one entry specifying the user,
  wherein the at least one entry specifies at least one network configuration parameter which the user is allowed to change, wherein the at least one entry specifies at least one virtual network stack associated with the at least one network configuration parameter which the user is allowed to change, and wherein the at least one virtual network stack is one of a plurality of network stacks executing in the global container.

17. The non-transitory computer readable medium of claim 16, wherein determining whether the user is allowed to change the network configuration parameter comprises determining whether the user has a privilege to change the network configuration parameter.

18. The non-transitory computer readable medium of claim 17, wherein the privilege is stored in the network configuration database.

19. The non-transitory computer readable medium of claim 17, wherein the privilege is one selected from a group consisting of Media Access Control (MAC) change privilege, an Internet Protocol (IP) address change privilege, a default route change privilege, an IP routing algorithm change privilege, and a Transport Layer Algorithm change privilege.

20. The non-transitory computer readable medium of claim 16, wherein the network configuration parameter is at least one selected from a group consisting of a Media Access Control (MAC) address and an internet protocol (IP) address.

21. The non-transitory computer readable medium of claim 16, wherein each of the plurality of non-global containers is associated with a respective one of the plurality of virtual network stacks executing in the global container.

22. The non-transitory computer readable medium of claim 16, wherein each of the plurality of virtual network stacks is associated with a respective one of a plurality of virtual network interface cards executing in the global container.

23. The non-transitory computer readable medium of claim 16, wherein the global container and the plurality of non-global containers share a common operating system kernel.

* * * * *